(12) United States Patent
Nie

(10) Patent No.: US 6,847,643 B2
(45) Date of Patent: Jan. 25, 2005

(54) SCALABLE DATA NETWORK, AND ROUTER FOR A SCALABLE DATA NETWORK

(75) Inventor: Xiaoning Nie, München (DE)

(73) Assignee: Infineon Technologies AG, Munich (DE)

(*) Notice: Subject to any disclaimer, the term of this patent is extended or adjusted under 35 U.S.C. 154(b) by 722 days.

(21) Appl. No.: 09/751,960

(22) Filed: Dec. 29, 2000

(65) Prior Publication Data

US 2002/0054592 A1 May 9, 2002

(30) Foreign Application Priority Data

Nov. 6, 2000 (DE) .......................................... 100 54 915

(51) Int. Cl.⁷ .............................................. H04L 12/28
(52) U.S. Cl. ...................................... 370/391; 370/386
(58) Field of Search .............................. 370/391, 392, 370/393, 394, 395.1, 396, 235, 360, 375, 376, 377, 378, 442, 443, 444, 458, 459, 461, 412, 386

(56) References Cited

U.S. PATENT DOCUMENTS

| 5,526,345 A | * | 6/1996 | Wallmeier | 370/395.4 |
| 5,748,615 A | * | 5/1998 | Riedel et al. | 370/230.1 |
| 5,754,529 A | * | 5/1998 | Heiss | 370/395.43 |
| 5,912,890 A | * | 6/1999 | Park | 370/375 |
| 6,246,691 B1 | * | 6/2001 | Briem et al. | 370/412 |

FOREIGN PATENT DOCUMENTS

| DE | 44 34 724 C1 | 11/1995 |
| EP | 0 660 557 A1 | 6/1995 |

* cited by examiner

Primary Examiner—Douglas Olms
Assistant Examiner—Ricardo M. Pizarro
(74) Attorney, Agent, or Firm—Laurence A. Green; Werner H. Stemer; Ralph E. Locher

(57) ABSTRACT

A network comprises routers, wherein at least some of the routers are configured to receive a number of datastreams and to output an aggregated datastream. Subject to the precondition that a limiting bit rate $r^i$ and a number of burst bits $b^i$ can be quoted for each datastream i supplied to a router from outside the network, such that the number $A^i_{in}(t1, t2)$ of data bits which are received at an input of the routers, between a time $t1$ and a later time $t2$, satisfies the relationship $A^i_{in}(t1, t2) \leq r^i*(t2-t1)+b^i$, each router j controls the output of data packets in the aggregated datastream ia(j) such that, for a limiting bit rate $R^{ia(j)}_{ag}$ and for a predeterminable burst bit number $B^{ia(j)}$, the number $A^{ia(j)}_{out}(t1, t2)$ of data bits output in the aggregated datastream ia(j) satisfies the relationship $A^{ia(j)}_{out}(t1, t2) \leq R^{ia(j)}_{ag}*(t2-t1)+B^{ia(j)}$, wherein $R^{ia(j)}_{ag}$ and $B^{ia(j)}$ are independent of the observation time period.

14 Claims, 2 Drawing Sheets

SCALABLE DATA NETWORK, AND ROUTER FOR A SCALABLE DATA NETWORK

BACKGROUND OF THE INVENTION

1. Field of the Invention

The invention relates to a (data) network having a number of routers, arranged in network nodes, for switching data packets. The invention further relates to a router and to a method for configuring a network, as well as to a method for aggregation and relaying of data packets, which are supplied to a router via a number of datastreams, to an output of the router.

So-called routers (data packet switching devices) are used for switching data packets in packet-switching networks. A router evaluates the addressing information contained in a data packet, and uses routing tables to determine the best onward route for the data packet through the network.

One serious problem in packet switching technology is the different propagation or delay times (delays) for packets in a datastream between a fixed transmitter and a fixed receiver. These different delay times are caused by different processing times in the individual network nodes (for example routers), and by the selection of different routes in the network. Fluctuations in the delay times are referred to as jitter. Both effects (delay and jitter) are particularly problematic in large networks and in time-critical applications.

The term "worst case delay" refers to the longest possible propagation time or maximum delay time which can occur in a network. This is an important parameter since receiving devices which receive data via the network are oriented to it. Normally, the maximum delay time in the network behaves in accordance with the relationship $n^h$, wherein n denotes the number of datastreams which are supplied to that router for which the maximum delay time is observed, and h denotes the number of routers which are located upstream of this router in the network, in terms of the routing of a data packet.

In order to reduce delay times and jitter during packet transmission in a network, the IETF (Internet Engineering Task Force) proposes, in the differentiated service standard, that data packets from different datastreams which are received at a router be combined into one output stream at the output from the router, provided they have specific, matching classification features ("code points"). This aggregated output datastream is then dealt with and switched with priority in the router (so-called "expedited forwarding (EF) behavior"). This form of data switching can potentially be used for real-time services such as video or voice.

Data aggregation in a router requires that the data rate of the transmitted, aggregated datastream be matched to the data rates of the incoming datastreams from which the aggregated datastream is formed. A router admittedly has buffer-storage areas in which the data can be temporarily buffer-stored when the data traffic is excessive. However, in the longer term, the data rate of the transmitted, aggregated datastream must correspond at least to the sum of the data rates of the associated input datastreams since, otherwise, the buffer-storage facilities in the router would otherwise undoubtedly be swamped at some point in time, leading to loss of data.

Furthermore, the occurrence of so-called bursts (groups of data) in the input datastreams must be taken into account, representing a number of additional data bits which occur once and must be coped with by the router. For this reason, the rate of the aggregated, transmitted output datastream is in practice always chosen to be greater than the sum of the data rates of the input datastreams which form the output stream.

On the other hand, however, a high output datastream data rate from a router is not necessarily always advantageous since this, in turn, has to be coped with by a downstream router. It is thus already known for a minimum time separation to be specified for data packets in an aggregated output datastream, which must be complied with during transmission of such data packets (so-called "peak rate" limiting), which simplifies the task of a downstream router in the data line route.

SUMMARY OF THE INVENTION

The object of the present invention is to provide a network, or a network domain, which overcomes the above-noted deficiencies and disadvantages of the prior art devices and methods of this general kind, and which makes it possible to minimize the increase in the maximum delay time (worst case delay) and jitter when a data packet is being transmitted through the network. It is a further object of the invention to provide a router having appropriate capabilities. The invention also aims to specify a method for configuration of a network which allows a data packet to be transported through a number of routers in the network with a short delay time and little jitter, while also specifying a method which handles the aggregation and relaying of data packets within a router in a manner which is suitable for this purpose.

With the above and other objects in view there is provided, in accordance with the invention, a network, comprising a plurality of routers with inputs and outputs connected in network nodes, for switching data packets in the network, wherein at least some of the routers are configured to receive and aggregate a plurality of datastreams and to output at least one aggregated datastream. The network is subject to the precondition that each datastream i supplied to a respective router from outside the network is subject to a limiting bit rate $r^i$ and a number of burst bits $b^i$, such that a number $A^i_{in}(t1, t2)$ of data bits received at an input of the router receiving the datastream i, between a time t1 and a later time t2, satisfies the relationship $$A^i_{in}(t1,t2) \leq r^{i*}(t2-t1)+b^i$$

for any given observation time period (t1, t2); each router j is configured to control an output of data packets in an output datastream ia(j) aggregated by the router, for a limiting bit rate $R^{ia(j)}_{ag}$ and for a predeterminable number of burst bits $B^{ia(j)}$, a number $A^{ia(j)}_{out}(t1, t2)$ of data bits output at one output of the router j in the given observation time period in the output data-stream ia(j) satisfies the relationship $$A^{ia(j)}_{out}(t1,t2) \leq R^{ia(j)}_{ag}*(t2-t1)+B^{ia(j)}$$

where the limiting bit rate $R^{ia(j)}_{ag}$ and the number of burst bits $B^{ia(j)}$ are independent of the observation time period (t1, t2).

With the above and other objects in view there is also provided, in accordance with the invention, a router for switching data packets in a network, comprising:

at least one input for receiving datastreams i;
an aggregation circuit connected to the at least one input for aggregating data packets from at least two received datastreams to form an aggregated datastream ia;

at least one output connected to the aggregation circuit for outputting the data packets in the aggregated datastream ia;

a data packet relaying circuit connected to the at least one output for controlling an output of the data packets in the aggregated datastream ia via the at least one output; and a buffer connected to the aggregation circuit for temporarily storing bits in the router;

wherein, subject to a precondition that a limiting bit rate $r^i$ and a number of burst bits $b^i$ is determined for each datastream i supplied to the router, such that a number $A^i_{in}(t1, t2)$ of data bits received from the datastream i at the input of the router between a time t1 and a later time t2 satisfies the relationship $$A^i_{in}(t1,t2) \leq r^i \cdot (t2-t1) + b^i$$

for any given observation time period (t1, t2);
the router controlling an emission of data packets in the aggregated datastream ia to the network such that $$A^{ia}_{out}(t1,t2) \leq R^{ia}_{ag} \cdot (t2-t1) + B^{ia}$$

is satisfied for a limiting bit rate $R^{ia}_{ag}$ and a number of burst bits $B^{ia}$ for the number $A^{ia}_{out}(t1, t2)$ of data bits in the aggregated datastream ia emitted to the network via the output from the data packet relaying circuit in the observation time period (t1, t2);

wherein $R^{ia}_{ag}$ and $B^{ia}$ are independent of the observation time period (t1, t2); and the number of burst bits $B^{ia}$ is variable on the router.

With the above and other objects in view there is also provided, in accordance with the invention, a method of configuring a network having routers in network nodes, wherein at least some of the routers are configured to receive and aggregate a number of datastreams, and to output in each case at least one aggregated datastream. The method comprises:

setting a precondition that a limiting bit rate $r^i$ and a number of burst bits $b^i$ are definable for each datastream i supplied to a router from outside the network, such that a number $A^i_{in}(t1, t2)$ of data bits received at an input of the router from the respective datastream i, between a time t1 and a later time t2, satisfies the relationship $$A^i_{in}(t1,t2) \leq r^i * (t2-t1) + b^i$$

for any given observation time period (t1, t2);

controlling, with each router j, an emission of data packets in the datastream ia(j) aggregated by the router j such that, for a limiting bit rate $R^{ia(j)}_{ag}$ and for a number of burst bits $B^{ia(j)}$, the number $A^{ia(j)}_{out}(t1, t2)$ of data bits output at one output of the router in the observation time period in the aggregated datastream ia(j) satisfies the relationship $$A^{ia(j)}_{out}(t1,t2) \leq R^{ia(j)}_{ag} * (t2-t1) + B^{ia(j)}$$

where $R^{ia(j)}_{ag}$ and $B^{ia(j)}$ are independent of the observation time period (t1,t2); and selecting a number of burst bits $B^{ia(j)}$ for each router j.

With the above and other objects in view there is also provided, in accordance with the invention, a method of aggregating and relaying data packets received in a number of datastreams i via at least one input of a router to an output of the router, subject to the precondition that a limiting bit rate $r^i$ and a number of burst bits $b^i$ can be determined for each datastream i supplied to the router, such that a number $A^i_{in}(t1, t2)$ of data bits received from the datastream i at the input of the router between a time t1 and a later time t2 satisfies the relationship $$A^i_{in}(t1,t2) \leq r^i * (t2-t1) + b^i$$

for any given observation time period (t1, t2),
the method which comprises the following steps:
selecting a number of burst bits $B^{ia}$ for the aggregated datastream ia;

controlling an output of data packets in the aggregated datastream ia such that the relationship $$A^{ia}_{out}(t1,t2) \leq R^{ia}_{ag} * (t2-t1) + B^{ia}$$

is satisfied for a limiting bit rate $R^{ia}_{ag}$ and the preselected number of burst bits $B^{ia}$ by the number $A^{ia}_{out}(t1, t2)$ of data bits in the aggregated datastream ia which are emitted at the output of the router in the observation time period (t1, t2); and wherein $R^{ia}_{ag}$ and $B^{ia}$ are independent of the observation time period (t1, t2).

The term network need not necessarily refer to a network in its totality, but can equally well refer to a part of a network, to a network section or to a network domain (that is to say a network area defined on the basis of logic aspects).

The invention is based on a network, which is understood in this sense and in which the bit rate $A^i_{in}(t1, t2)/dt2$ of all the datastreams i which enter the network from the outside satisfies the strict condition $A^i_{in}(t1, t2)/dt2 \leq r^i$. This means that each incoming datastream i has an upper rate limit $r^i$. If one considers the number of bits $A^i_{in}(t1, t2)$ received at the router in the time interval t1 to t2, it is also necessary to take account of the number of burst bits $b^i$, which is in the form of an integration constant. This is also known for each datastream i which enters the network.

Subject to this precondition, the invention, referred to in general terms, is based on the idea of limiting the number of burst bits for each router output at which an aggregated datastream is output. This means that the maximum delay time and the jitter of a data packet as it passes through the various routers of the network rise linearly (in proportion to n*h), rather than being subject to the exponential growth that normally occurs.

The provision according to the invention of an upper limit $B^{ia(j)}$ for the number of burst bits in each aggregated datastream ia(j) output from one of the routers j means that the number $A^{ia(j)}_{out}(t1, t2)$ of data bits in this aggregated, output datastream ia(j) in any given observation time period from t1 to t2 never assumes a value which is greater than $R^{ia(j)}_{ag} * (t2-t1) + B^{ia(j)}$, where $R^{ia(j)}_{ag}$ and $B^{ia(j)}$ are independent of the observation time period.

The term "any given observation time period" relates, however, only to time periods during which the network is in a steady state, that is to say to a time period in which the limiting bit rates $r^i$ of the datastreams supplied to the network are constant. The quoted equations must be satisfied—for any given t1 to t2—within such a time period. It is, of course, impossible to prevent a situation in which the limiting bit rates $r^i$ in a later time period have different values and in which the quoted equations then apply—with changed parameters—to "any given" observation time periods once again.

The term datastream relates to data packets which originate from the same source and are destined for the same recipient—that is to say a datastream corresponds to a "connection" in normal spoken use.

The number of burst bits $B^{ia(j)}$ is preferably chosen as a standard for all the routers j, in particular in accordance with $B^{ia(j)} = B_{max} := \max\{b^{i1}, b^{i2}, \ldots b^{iZ}\}$, where i1, i2, ..., iZ denote the datastreams which are introduced into the network from the outside at network access points. All the routers j are then configured as standard throughout the network since $B_{max}$ is a constant which does not depend on the router j under consideration.

A further advantageous refinement of the invention is wherein $R^{ia(j)}_{ag} = r^{i2(j)} + r^{i1(j)} + \ldots$ where i1(j), i2(j), ... denote those datastreams which are received by the router j and are aggregated by the router j to form the datastream ia(j) output from it (i1(j), i2(j), ... may be either datastreams supplied from outside the network or internal datastreams within the network). This configuration of the router j means that the router j produces the output, aggregated datastream ia(j) with the minimum possible data rate.

If all the routers throughout the entire network are configured in a corresponding manner, this statement is applicable to the entire network.

A router according to the invention, which is designed for switching and aggregation of data packets in a network, can be configured in an analogous manner via the two parameters $R^{ia}_{ag}$ and $B^{ia}$ with regard to the aggregated output datastream produced from it. In this case, the maximum permissible number of burst bits $B^{ia}$ in the aggregated output datastream ia can be varied as desired on the router.

One particularly preferred exemplary embodiment of such a configurable router according to the invention is wherein the router comprises a control memory whose input is connected to the output of the router and which has an output via which the control memory is emptied at the bit rate $R^{ia}_{ag}$, and in that the router furthermore has a measurement circuit which determines the filling level of the control memory. A data packet relaying means then controls the transmission of a data packet as a function of the filling level of the control memory.

Other features which are considered as characteristic for the invention are set forth in the appended claims.

Although the invention is illustrated and described herein as embodied in a scalable data network, and router for a scalable data network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
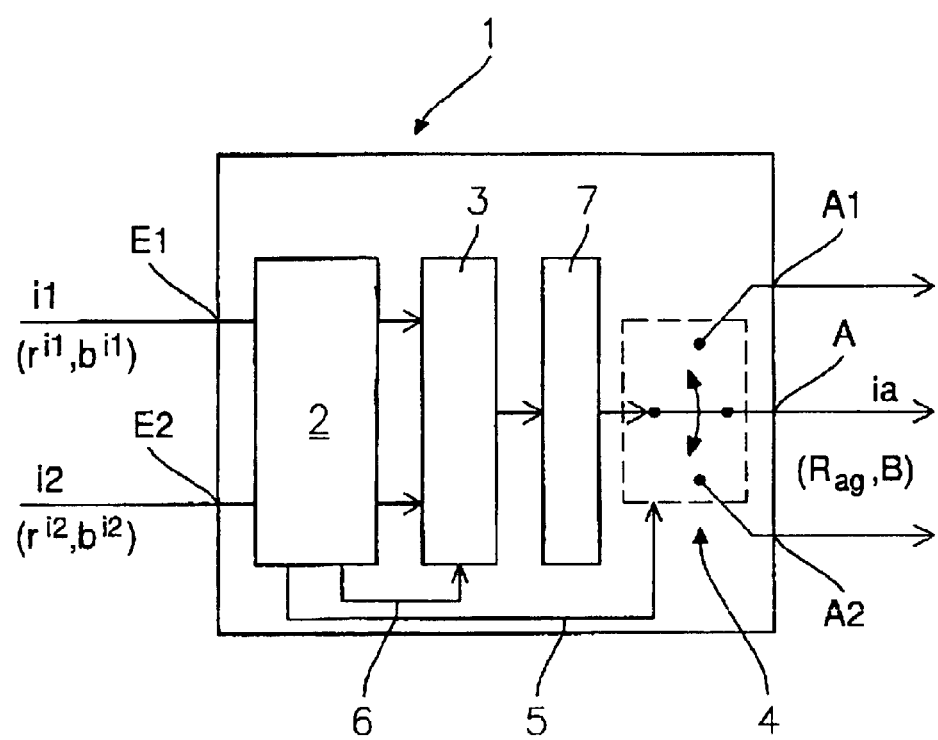
FIG. 1 is a schematic block diagram of a router according to the invention, explaining the switching and aggregation of datastreams.

Referring now to the figures of the drawing in detail and first, particularly, to FIG. 1 thereof, there is seen a router 1 with a first input E1, a second input E2, and a first, a second, and a third output A1, A2, and A. The router 1 furthermore comprises an evaluation circuit 2, an aggregation circuit 3 downstream from the evaluation circuit 2, and a data packet relaying circuit 4 located in the data path downstream from the aggregation circuit 3. A buffer store 7 is arranged between the aggregation circuit 3 and the data packet relaying circuit 4, and is used for temporary storage of data bits.

In the following, the datastream received via the input E1 will be referred to as i1, and the datastream received via the input E2 will be referred to as i2. The evaluation circuit 2 receives the datastreams i1 and i2 and evaluates each of the data packet headers in the received data packets. The data packet header is that part of a data packet which contains various administration data (destination address, packet number, transmitter identification, packet status, classification features etc.) rather than user data.

The datastreams i1 and i2 can also be received via a common input to the router 1. This means that only a number of logic inputs are required (one logic input for each datastream) but not a number of actual inputs.

On the basis of the evaluation of the destination address and, if appropriate, of further information in the data packet header, the evaluation circuit 2 uses routing tables to assign one of the outputs A1 or A2, or A, to each incoming data packet. The assignment process takes place via a control line 5, which connects the evaluation circuit 2 to the data packet relaying circuit 4.

Another option for assignment of an output A1, A2 or A is for the evaluation circuit 2 to investigate the data packet headers for a classification feature, for example the so-called code point. The code point forms a classification feature both for the destination address (that is to say the recipient) and for specific switching quality features, for example EF. This means that data packets with the same destination address and the same quality feature, for example, EF, have the same code point. The router then "sorts" the data packets just on the basis of their code point. Data packets with an identical code point are assigned to the same output A1, A2 or A, are combined in a common datastream and—if the code point is a code point for EF—are passed on with priority.

The quality feature EF is defined in IETF Standard RFC 20598 (1999). This Standard is supplemented by reference to the disclosure content of the present document.

It is either possible for the code point to be already present in the data packet header of the incoming data packets (in which case this is all that is investigated for passing on the data packet) or, alternatively, a code point may be produced in the router on the basis of the destination address and of further data in an incoming data packet, and may then be made available to downstream routers for their switching task.

The combination or aggregation of such data packets in a single datastream is carried out by the aggregation circuit 3 as a function of an aggregation instruction, which is produced by the evaluation circuit 2 for data packets with an identical classification feature (code point) and is supplied via a control line 6 to the aggregation circuit 3.

FIG. 1 shows the situation in which the datastreams i1 and i2 are joined together by means of the aggregation circuit 3 and are passed to the third output A via the data packet relaying circuit 4. The aggregated datastream at the third output A is referred to as ia in the following text.

A general assumption in the following text is that all the input datastreams i (in the present example i=i1 and i2) satisfy the condition:

$$A^i_{in}(t1,t2) \leq r^i \cdot (t2-t1) + b^i \quad (1)$$

In this case, $A^i(t1, t2)$ denotes the number of data bits which are received within a time period from t1 to t2 at an input E1, E2 of the router 1 to which the datastream i is fed, $r^i$ denotes an upper limit for the maximum permissible bit rate of this datastream, and $b^i$ denotes a maximum number of additional bits which may occur in an acceptable manner in the datastream i irrespective of the observation time period. The parameter $b^i$ is referred to as the number of burst bits, as already mentioned. It should be mentioned that, irrespective of the total number of burst bits $b^i$, the maximum bit rate of the datastream i is always limited by the parameter $r^i$, since derivation of the number of burst bits $b^i$ after the time t2 always gives the value 0.

For the datastreams i1 and i2 considered in FIG. 1, condition (1) can be expressed as follows:

$$A^{i1}_{in}(t1,t2) \leq r^{i1} \cdot (t2-t1) + b^{i1}$$
$$A^{i2}_{in}(t1,t2) \leq r^{i2} \cdot (t2-t1) + b^{i2}. \quad (2)$$

On the assumption that the aggregated datastream ia is formed just from the data packets in the datastreams i1 and i2, the following inequality applies to the number of data bits contained in the aggregated datastream ia during the time period t1 to t2:

$$A^{ia}_{out}(t1,t2) \leq A^{i1}_{in}(t1,t2) + A^{i2}_{in}(t1-t2) = b^{i1} + b^{i2} + (r^{i1}+r^{i2}) \cdot (t2-t1). \quad (3)$$

The process of passing on the received data packets will be considered in the following text. The amount of memory in the buffer store 7 is necessarily limited. In order reliably to prevent the buffer store 7 from overflowing (assuming a given observation time period t1 to t2), the data packet relaying circuit 4 must handle the process of passing on the data bits in accordance with the following condition:

$$W(t1,t2) \geq (r^{i1}+r^{i2}) \cdot (t2-t1) - b \quad (4)$$

In this case W(t1, t2) denotes the number of data bits passed on to the output A in the time period from t1 to t2, and b is a selectable constant. In this case, for any given time t2, the number of data bits Q(t2) which are stored in the buffer store 7 of the router 1 and are intended for the output A is limited by the expression:

$$Q(t2) = A^{i1}_{in}(t1,t2) + A^{i2}_{in}(t1,t2) - W(t1,t2) \leq b^{i1} + b^{i2} + b = SP \quad (5)$$

Since $b^{i1}$, $b^{i2}$ and b are constants which are independent of time, the inequality (5) means that, if the amount of memory is SP, the buffer store 7 can never overflow, provided (subject to the precondition (2) mentioned in the introduction, for the datastreams i1, i2) the data packet relaying circuit 4 does not pass on the data packets more slowly than at the rate defined by equation (4).

Since $$A^{ia}_{out}(t1,t2) = W(t1,t2) \quad (6)$$

condition (4) represents a lower limit for the number of data bits which must be included in the aggregated datastream ia during the time period from t1 to t2.

However, on the other hand, an upper limit for $A^{ia}_{out}$ is also desirable. This is because a downstream router has to process and switch the datastream ia as an input datastream. Unnecessarily rapid "handling" in the data packet relaying circuit 4 in the router 1 increases the performance requirements for the throughput of downstream routers. Since a network normally contains routers that are subject to different performance requirements, excessively "fast" relaying of data packets in the router 1 increases the jitter and the time discrepancy for transporting data packets via a large number of routers, for example through the network.

According to the invention, the router 1 is thus configured such that the aggregated datastream ia emitted at the output A satisfies the following condition for any given times t1, t2:

$$A^{ia}_{out}(t1,t2) \leq R^{ia}_{ag} \cdot (t2-t1) + B^{ia} \quad (7)$$

In this case, $R^{ia}_{ag}$ indicates a limiting bit rate intended for the datastream ia, and $B^{ia}$ indicates a number of burst bits which can be preset for the datastream ia. In other words, equation (7) means that the output, aggregated datastream ia also satisfies the condition stated in equation (1) for incoming datastreams.

$R^{ia}_{ag}$ must be set in dependence on the bit rates $r^{i1}$ and $r^{i2}$ of the incoming datastreams i1, i2 which form the datastream ia. In order to prevent the buffer store in the router 1 from overflowing, $R^{ia}_{ag}$ must be $\geq r^{i1}+r^{i2}$.

Conventional prior art routers use an output bit rate which is always greater than the sum of the input bit rates of the datastreams to be aggregated. On the basis of equation (7), the router 1 according to the invention can operate at the minimum possible output bit rate $R^{ia}_{ag} = r^{i1}+r^{i2}$.

Figure 2:
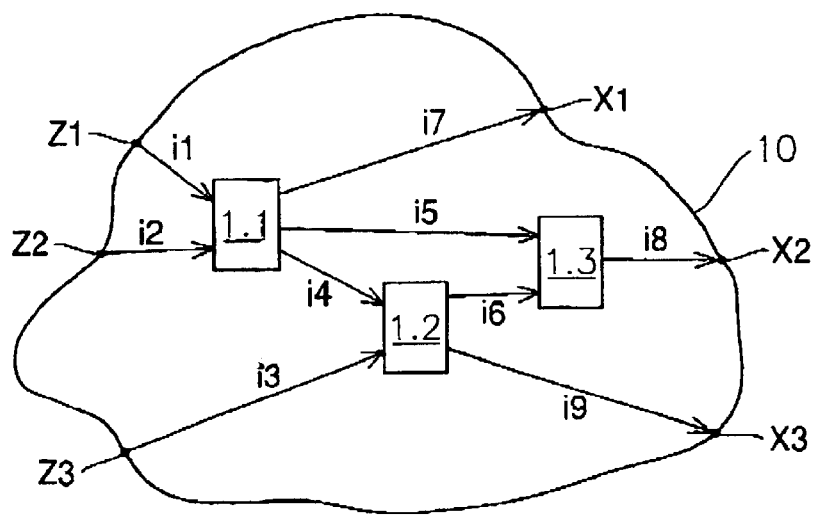
FIG. 2 is a schematic illustration of a network according to the invention.

Referring now to FIG. 2, there is shown a network 10, or an area of a network, which comprises three routers 1.1, 1.2 and 1.3. Datastreams i1, i2 and i3 are supplied to the network 10 at access points Z1, Z2 and Z3. The datastreams i1 and i2 are passed to the first router 1.1, while the datastream i3 is supplied to the second router 1.2. An output datastream i4 forms a further input datastream for the router 1.2. Datastreams i5 and i6 are supplied to the third router 1.3.

Datastreams i7, i8 and i9 are supplied to output points X1, X2 and X3 from the network 10.

It is assumed that the datastreams i1, i2 and i3 supplied to the network via the access points Z1, Z2 and Z3 all satisfy condition (1). The invention ensures that the datastreams i4 to i9 which are output from one of the routers 1.1, 1.2 or 1.3 satisfy condition (7). In other words, each router 1.1, 1.2 and 1.3 is configured with regard to the parameters $R^{ia(j)}_{ag}$ and $B^{ia(j)}$ such that equation (7) is always satisfied for ia(j)=i4, i5, . . . , i9. The index j denotes the router under consideration, that is to say 1.1, 1.2 or 1.3. Overall, this means that each datastream in the network (irrespective of whether it is supplied from the outside or is produced as an aggregated output datastream ia(j) by a router 1.1, 1.2, 1.3) always satisfies condition (1). The essential aspect is that this condition always remains valid for any given observation time period t2−t1, starting from an initial time t1.

One particularly preferred configuration of the network 10 comprises a standard maximum number of burst bits $B_{max}$ being defined for the entire network, and the number of burst bits in all the aggregated datastreams in the network being set to this maximum number of burst bits, that is to say $B^{ia(j)} = B_{max}$ for all ia(j)=i4, i5, . . . , i9. In this case, $B_{max}$ is defined by the maximum number of burst bits in the datastreams supplied to the network 10 from the outside. Accordingly, $B_{max} = \max\{b^{i1}, b^{i2}, b^{i3}\}$ for the example illustrated in FIG. 2. This results in the routers 1.1, 1.2, 1.3 having a standard configuration throughout the network with regard to the number of burst bits. The number of burst bits $B_{max}$ is then never exceeded anywhere in the network. All that is necessary is to individually set an adequate output bit rate $R^{ia(j)}_{ag}$ for each router as a function of the bit rates of the datastreams which are received.

In this context, a "minimum rate" configuration of the overall network 10 is achieved by each individual router 1.1, 1.2, 1.3 producing the minimum data rate $R^{ia(j)}_{ag}=r^{i1(j)}+r^{i2}_{(j)}+\ldots$ at its output A, which outputs an aggregated datastream. In this case, $r^{i1(j)}$ and $r^{i2(j)}$ denote the maximum permissible data rates of the input datastreams i1(j) and i2(j) of the j-th router, which are combined to form the aggregated datastream ia(j) at the output of the router j under consideration. For example, for the router 1.2, the following holds:

$i1(j)=i4$, $i2(j)=i3$ and $ia(j)=i9$ or $i6$.

The invention is not, of course, limited to aggregation of only two input datastreams and, in fact, in the context of EF, a far greater number of datastreams may also be aggregated to form one output datastream.

Figure 3:
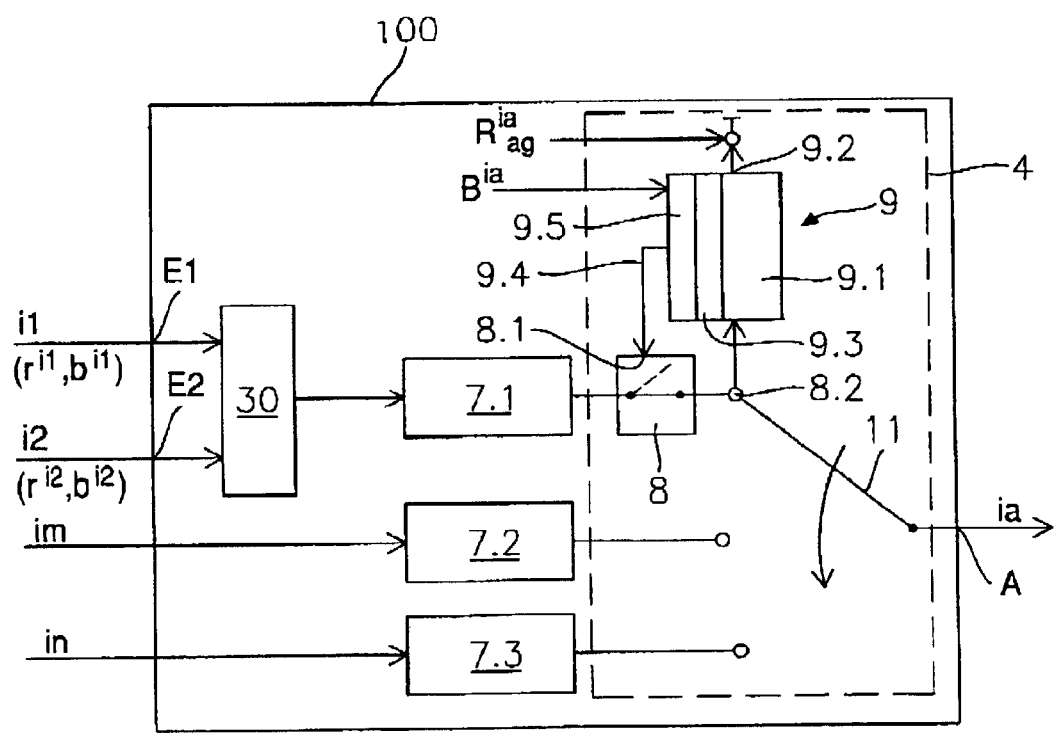
FIG. 3 is a schematic circuit diagram of a circuit configuration in a router according to the invention, which can be used for aggregating and relaying a datastream according to the invention.

Referring now to FIG. 3, there is shown, schematically, a design layout of a router 100 with the configuration capability according to the invention with regard to the number of burst bits $B^{ia}$ in the output datastream ia. Parts and parameters or variables which are the same as those in FIG. 1 are denoted by the same reference symbols. The evaluation circuit 2 is not shown in FIG. 3, for the sake of simplicity.

The router 100 receives the datastreams i1, i2, and further datastreams im and in. The datastreams i1 and i2 are supplied to a multiplexer 30, which provides the aggregation circuit 3 illustrated in FIG. 1. One output of the multiplexer 30 is connected to one input of a buffer store 7.1. Further buffer stores 7.2 and 7.3 are fed from the datastreams im and in, respectively. Each buffer store 7.1, 7.2, 7.3 is able to store at least one data packet—although, in general, they can store a very much greater number of data packets. The buffer stores 7.1, 7.2, 7.3 may be in the form of FIFO (first-in, first-out) memories.

The output of the buffer store 7.1 is supplied to a switch 8, whose switch position can be influenced via a control input 8.1.

One output 8.2 of the switch 8 is connected to one input of a measurement arrangement 9 and, furthermore, represents an input for a selection switch 11 for the data packet relaying circuit 4. The measurement arrangement 9 comprises a control memory 9.1. One output of the control memory 9.1 is denoted by the reference symbol 9.2. The measurement arrangement 9 furthermore has an associated measurement circuit 9.3, which determines the filling level of the control memory 9.1. The measurement circuit 9.3 is followed by a comparator circuit 9.5. The comparator circuit 9.5 has one input via which the number of burst bits $B^{ia}$ which is intended to be used for configuring the router 100 is supplied to the comparator circuit 9.5. Via a line 9.4, the comparator circuit 9.5 outputs a control signal which defines the switch position (open or closed) of the switch 8.

The method of operation of the router 100 is described in the following text.

The three buffer stores 7.1, 7.2, 7.3 represent the queues for the router 100. One of the queues can be connected to the output A of the router 100 by means of the selection switch 11. According to the EF concept, 4 is operated as a priority data packet relaying circuit, that is to say the outputs of the buffer stores 7.2 and 7.3 are not applied to the output A of the router 100 unless the buffer store 7.1 does not contain any data packet which is ready for handling.

When the switch 8 is closed, data packets which are stored in the buffer store 7.1 are transferred to the output A of the router 100, and at the same time fill the control memory 9.1 bit-by-bit. The control memory 9.1 is emptied via its output 9.2 at the bit rate $R^{ia}_{ag}$, which can be preset (but which must be equal to or greater than the sum of the input bit rates $r^{i1}$ and $r^{i2}$). The number of bits stored in the control memory 9.1 is denoted by BS, and this is determined continuously by the measurement circuit 9.3. The comparator circuit 9.5 receives the value BS and compares it with the parameter $B^{ia}-1p$. In this case, 1p is the packet size, that is to say the number of bits in the data packet that currently needs to be handled.

The switch position of the switch 8 is controlled as follows, on the basis of this comparison:

if $BS \leq B^{ia}-1p$, the switch 8 is closed, that is to say the associated packet is transmitted;

if $BS > B^{ia}-1p$, the switch 8 is open, that is to say this prevents the associated packet from being transmitted.

In the second case, that is to say once the switch 8 has been opened, the filling level of the control memory 9.1 is reduced at the variable bit rate $R^{ia}_{ag}$. As soon as the condition for closing the switch 8 is satisfied once again, the data packet is transmitted.

I claim:

1. A network, comprising a plurality of routers with inputs and outputs connected in network nodes, for switching data packets in the network, wherein at least some of said routers are configured to receive and aggregate a plurality of datastreams and to output at least one aggregated datastream, and wherein subject to a precondition that each datastream i supplied to a respective said router from outside the network is subject to a limiting bit rate $r^i$ and a number of burst bits $b^i$, such that a number $A^i_{in}(t1, t2)$ of data bits received at an input of said router receiving the datastream i, between a time t1 and a later time t2, satisfies the relationship $A^i_{in}(t1, t2) \leq r^{i*}(t2-t1)+b^i$ for any given observation time period (t1, t2);

each said router j is configured to control an output of data packets in an output datastream ia(j) aggregated by said router, for a limiting bit rate $R^{ia(j)}_{ag}$ and for a predeterminable number of burst bits $B^{ia(j)}$, a number $A^{ia(j)}_{out}(t1, t2)$ of data bits output at one output of said router j in the given observation time period in the output data stream ia(j) satisfies the relationship $A^{ia(j)}_{out}(t1, t2) \leq R^{ia(j)}_{ag}*(t2-t1)+B^{ia(j)}$ where the limiting bit rate $R^{ia(j)}_{ag}$ and the number of burst bits $B^{ia(j)}$ are independent of the observation time period (t1, t2).

2. The network according to claim 1, wherein all of said routers j are subject to an identical number of burst bits $B^{ia(j)}=B_{max}$ selected as a standard throughout the network.

3. The network according to claim 2, wherein $B_{max}:=\max\{b^{i1}, b^{i2}, \ldots, b^{iZ}\}$, whit i1, i2, ..., iZ denoting the datastreams fed into the network from outside at network access points (Z1, Z2, Z3).

4. The network according to claim 1, wherein the limiting bit rate $R^{ia(j)}_{ag}=r^{i1(j)}+r^{i2(j)}+$ is selected individually for each individual said router j, wherein i1(j), i2(j), ... denote those datastreams which are received by the router j and are aggregated by the router j to form the output datastream ia(j) output from said router j.

5. A router for switching data packets in a network, comprising:

at least one input for receiving datastreams i;

an aggregation circuit connected to said at least one input for aggregating data packets from at least two received datastreams to form an aggregated datastream ia;

at least one output connected to said aggregation circuit for outputting the data packets in the aggregated datastream ia;

a data packet relaying circuit connected to said at least one output for controlling an output of the data packets in the aggregated datastream ia via said at least one output; and a buffer connected to said aggregation circuit for temporarily storing bits in the router;

wherein, subject to a precondition that a limiting bit rate $r^i$ and a number of burst bits $b^i$ is determined for each datastream i supplied to the router, such that a number $A^i_{in}(t1, t2)$ of data bits received from the datastream i at said input of said router between a time t1 and a later time t2 satisfies the relationship $$A^i_{in}(t1, t2) \leq r^i \cdot (t2-t1) + b^i$$

for any given observation time period (t1, t2);

said router controlling an emission of data packets in the aggregated datastream ia to the network such that $$A^{ia}_{out}(t1, t2) \leq R^{ia}_{ag} \cdot (t2-t1) + B^{ia}$$

is satisfied for a limiting bit rate $R^{ia}_{ag}$ and a number of burst bits $B^{ia}$ for the number $A^{ia}_{out}(t1, t2)$ of data bits in the aggregated datastream ia emitted to the network via said output from said data packet relaying circuit in the observation time period (t1, t2);

where $R^{ia}_{ag}$ and $B^{ia}$ are independent of the observation time period (t1, t2); and the number of burst bits $B^{ia}$ is variable on the router.

6. The router according to claim 5, which further comprises:

a control memory having an input connected to said output of the router and having an output via which said control memory is emptied at the bit rate $R^{ia}_{ag}$;

a measurement circuit connected to said control memory for determining a filling level of said control memory; and wherein said data packet relaying device controls a transmission of a data packet in dependence on the filling level of said control memory.

7. The router according to claim 5, wherein said data packet relaying device is configured to output the data packets in accordance with EF.

8. A method of configuring a network having routers in network nodes, wherein at least some of the routers are configured to receive and aggregate a number of datastreams, and to output in each case at least one aggregated datastream, the method which comprises:

setting a precondition that a limiting bit rate $r^i$ and a number of burst bits $b^i$ are definable for each datastream i supplied to a router from outside the network, such that a number $A^i_{in}(t1, t2)$ of data bits received at an input of the router from the respective datastream i, between a time t1 and a later time t2, satisfies the relationship $$A^i_{in}(t1, t2) \leq r^{i*}(t2-t1) + b^i$$

for any given observation time period (t1, t2);

controlling, with each router j, an emission of data packets in the datastream ia(j) aggregated by the router j such that, for a limiting bit rate $R^{ia(j)}_{ag}$ and for a number of burst bits $B^{ia(j)}$, the number $A^{ia(j)}_{out}(t1, t2)$ of data bits output at one output of the router in the observation time period in the aggregated datastream ia(j) satisfies the relationship $$A^{ia(j)}_{out}(t1, t2) \leq R^{ia(j)}_{ag} * (t2-t1) + B^{ia(j)}$$

where $R^{ia(j)}_{ag}$ and $B^{ia(j)}$ are independent of the observation time period (t1, t2); and selecting a number of burst bits $B^{ia(j)}$ for each router j.

9. The method according to claim 8, which comprises selecting $B^{ia(j)} = B_{max}$ as standard throughout the network, for all the routers j.

10. The method according to claim 9, which comprises defining $B_{max} := \max\{b^{i1}, b^{i2}, \ldots, b^{iZ}\}$, wherein i1, i2, ..., iZ denote the datastreams fed into the network from outside at network access points.

11. The method according to claim 8, which comprises selecting the limiting bit rate $R^{ia(j)}_{ag} = r^{i1(j)} + r^{i2(j)} + \ldots$ individually for each individual router j, wherein i1(j), i2(j), ... denotes those datastreams which are received by the router j and are aggregated by the router j to form the datastream ia(j) output by the router j.

12. A method of aggregating and relaying data packets received in a number of datastreams i via at least one input of a router to an output of the router, subject to the precondition that a limiting bit rate $r^i$ and a number of burst bits $b^i$ can be determined for each datastream i supplied to the router, such that a number $A^i_{in}(t1, t2)$ of data bits received from the datastream i at the input of the router between a time t1 and a later time t2 satisfies the relationship $$A^i_{in}(t1, t2) \leq r^{i*}(t2-t1) + b^i$$

for any given observation time period (t1, t2), the method which comprises the following steps:

selecting a number of burst bits $B^{ia}$ for the aggregated datastream ia;

controlling an output of data packets in the aggregated datastream ia such that the relationship $$A^{ia}_{out}(t1, t2) \leq R^{ia}_{ag} * (t2-t1) + B^{ia}$$

is satisfied for a limiting bit rate $R^{ia}_{ag}$ and the preselected number of burst bits $B^{ia}$ by the number $A^{ia}_{out}(t1, t2)$ of data bits in the aggregated datastream ia which are emitted at the output of the router in the observation time period (t1, t2); and wherein $R^{ia}_{ag}$ and $B^{ia}$ are independent of the observation time period (t1, t2).

13. The method according to claim 12, wherein the router has a control memory which is filled by the data bits in the aggregated datastream ia and is emptied at the bit rate $R^{ia}_{ag}$, and the method further comprises:

determining a filling level of the control memory; and controlling a process of outputting data packets in the aggregated datastream ia as a function of the filling level of the control memory.

14. The method according to claim 12, which comprises outputting the data packets in accordance with EF.

* * * * *